(12) United States Patent
Miller

(10) Patent No.: US 12,149,789 B2
(45) Date of Patent: *Nov. 19, 2024

(54) DEEP REINFORCEMENT LEARNING FOR PERSONALIZED SCREEN CONTENT OPTIMIZATION

(71) Applicant: Adeia Guides Inc., San Jose, CA (US)

(72) Inventor: Kyle Miller, Durham, NC (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,497

(22) Filed: Jun. 1, 2023

(65) Prior Publication Data

US 2023/0319357 A1  Oct. 5, 2023

Related U.S. Application Data

(63) Continuation of application No. 17/581,490, filed on Jan. 21, 2022, now Pat. No. 11,706,491, which is a
(Continued)

(51) Int. Cl.
*H04N 21/466* (2011.01)
*G06N 3/088* (2023.01)

(52) U.S. Cl.
CPC ......... *H04N 21/4666* (2013.01); *G06N 3/088* (2013.01); *H04N 21/4668* (2013.01)

(58) Field of Classification Search
CPC . H04N 21/4668; H04N 21/4666; G06N 3/088
See application file for complete search history.

(56) References Cited

U.S. PATENT DOCUMENTS 10,715,869 B1  7/2020  Miller
11,265,609 B2  3/2022  Miller
(Continued)

OTHER PUBLICATIONS

Anonymous: Application programming interface—Wikipedia Retrieved from the Internet: URL:https://en.wikipedia.org/w/index.php?title=Application programming interface&oldid=83634114514 Apr. 2018 (Apr. 14, 2018), XP055615138.
(Continued)

*Primary Examiner* — Mulugeta Mengesha
(74) *Attorney, Agent, or Firm* — Haley Guiliano LLP

(57) ABSTRACT

Systems and methods are described for selecting content item identifiers for display. The system may identify a set of content items that are likely to be requested in the future based on a history of content item requests. The system then selects a first plurality of content categories using a category selection neural net and selects a first set of recommended content items for the first plurality of content categories. The system increases a reward score for the first plurality of content categories based on receiving a request for a content item that is included in the first set of recommended content items. The system also decreases the reward score for the first plurality of content categories based on determining that the requested content item is included in the set of content items that are likely to be requested in the future. The neural net is trained based on the reward score of the first plurality of content categories to reinforce reward score maximization. The trained neural net is the used to select content items for display.

20 Claims, 7 Drawing Sheets

Related U.S. Application Data continuation of application No. 16/893,054, filed on Jun. 4, 2020, now Pat. No. 11,265,609, which is a continuation of application No. 16/228,123, filed on Dec. 20, 2018, now Pat. No. 10,715,869.

(56) References Cited

U.S. PATENT DOCUMENTS

| | | | |
|---|---|---|---|
| 2015/0052561 | A1 | 2/2015 | Austin |
| 2016/0379123 | A1* | 12/2016 | Younessian ............ G06Q 50/01 706/52 |
| 2017/0228385 | A1* | 8/2017 | Zheng .............. H04N 21/25891 |
| 2018/0075137 | A1 | 3/2018 | Lifar et al. |
| 2018/0225710 | A1* | 8/2018 | Kar ................... G06Q 30/0254 |
| 2019/0327139 | A1* | 10/2019 | Söderlind ........... H04L 41/0809 |
| 2019/0332920 | A1* | 10/2019 | Sermanet ................ G06N 3/08 |
| 2020/0204862 | A1 | 6/2020 | Miller |
| 2020/0304873 | A1 | 9/2020 | Miller |
| 2022/0150589 | A1 | 5/2022 | Miller |

OTHER PUBLICATIONS

International Search Report and Written Opinion of PCT/US2019/067973 dated Feb. 27, 2020.

Fakhfakh , et al., "Deep learning-based recommendation: current issues and challenges", International Journal of Advanced Computer Science and Applications, vol. 8, No. 12, pp. 59-68, (2017).

Kunaver , et al., "Diversity in recommender system—A Survey", Knowledge-Based Systems, vol. 123, pp. 154-162, (2017).

Levin, Sergey , "Actor-Critic Algorithms, CS 294-112: Deep Reinforcement Learning", 13 ttp://r3j Leecs.berkelev.eatuldeepricottyse-f31 7/ 1 7ciocsilectuue 5 3 ctor critic pcif,pctf, Nov. 14, 2018.

Nilashi , et al., "A new method for collaborative filtering recommender systems: The case of Yahoo! Movies and TipAdvisor datasets", An International Journal JSCDSS, 3(5):44-46 (2016).

Qusai, Shambour , "A user-based multi-criteria recommendation approach for personalized recommendations", Int' J. of Computer Science and Information Security, 14(12):657-663 (2016).

\* cited by examiner

DEEP REINFORCEMENT LEARNING FOR PERSONALIZED SCREEN CONTENT OPTIMIZATION

CROSS-REFERENCE TO RELATED APPLICATIONS

This application is a continuation of U.S. patent application Ser. No. 17/581,490, filed Jan. 21, 2022, which is a continuation of U.S. patent application Ser. No. 16/893,054, now U.S. Pat. No. 11,265,609, filed Jun. 4, 2020, which is a continuation of U.S. patent application Ser. No. 16/228,123, now U.S. Pat. No. 10,715,869, filed Dec. 20, 2018. The disclosures of which are hereby incorporated by reference herein in their entireties.

BACKGROUND

The present disclosure relates to improved selection and presentation of content items, and more particularly, to techniques for training a neural net to select content items for presentation by incentivizing selection of diverse explorative content and dis-incentivizing selection of content that is already likely to be requested.

SUMMARY

Computerized content delivery and presentation systems commonly face a task of generating recommendation screens. For example, OTT (over-the-top) video delivery systems and online music delivery services commonly need to generate such recommendation screens. Generation of appropriate and engaging screens is highly important because it allows such systems to inform the users about relevant content offerings and promote views. One approach to selecting content for the recommendation screen is to display content recommendations curated by human editors. However, this approach does not take into account preferences of each individual user and will inevitably result in presentation of irrelevant or redundant content recommendations. Another approach is to display groups of content items that are similar to content items most commonly requested by that user. However, this approach commonly results in presentation of homogenous content item recommendations that user was already likely to request. Such recommendation techniques are inefficient because they fail to provide new information and fail to expose a user to new relevant content.

To overcome these problems, a content recommendation application is provided that uses a neural net trained to incentivize selection of relevant content while dis-incentivizing selection of content that is already likely to be requested. To this end, the content recommendation application performs an intelligent selection of content categories from a superset of all available categories by using a category section neural net that was trained specifically to recommend relevant content to a particular user while avoiding recommendation of content that the particular user would request even without seeing the recommendation screen.

In one implementation, the content recommendation application identifies a set of content items that are likely to be requested by the particular user. For example, the content recommendation application may identify such a set based on a history of past content item requests from the particular user. Then, the content recommendation application selects a first plurality of content categories using a category selection neural net. For example, the neural net may be a set of neurons connecting features (e.g., used features) with a superset of all available content categories. In such a case, the neural net accepts features (e.g., user features) as input and selects some of the possible content categories via the neural connections. Once the plurality of content categories is selected, the content recommendation application selects a first set of recommended content items for the first plurality of content categories. For example, the content recommendation application may query a traditional or custom-built recommendation engine for available content items in the selected categories.

Once the first set of recommended content items is selected, the content recommendation application may (e.g., without displaying such recommendations) monitor actual content requests received from the particular user over a certain time period (e.g., a week or ten days). When a request is received from a user for a content item that is included in the first set of recommended content items, the reward score for the first plurality of content categories is increased (e.g., by a value of 1). However, if the requested content item is included in the set of content items that are likely to be requested in the future, the reward score for the first plurality of content categories is decreased (e.g., by 1 or by 0.5). This decrease in the reward score allows for training the neural net to avoid selecting content that the user would have watched regardless.

After the offline monitoring period has elapsed, the content recommendation application uses the computed reward score to train (e.g., adjust) the neural net. For example, the connection between neurons may be adjusted to reinforce reward score maximization. For example, neural connections that led to a high reward score are likely to remain, while neural connections that led to a low reward score are likely to be removed or changed.

Once the neural net is trained (e.g., by repeating, several times, the steps described above), the content recommendation application selects a second plurality of content categories using the trained category selection neural net. Then, the content recommendation application selects a second set of recommended content items for the second plurality of content categories. The content recommendation application may then actually display identifiers for recommended content items of the second set of recommended content items. As explained above and below, such technique is likely to result in presentation of identifiers for content items that are relevant to the particular user but are not the type of items that would have been watched by the user regardless. In this way, the aforementioned technique provides an improved user interface for a computerized content delivery system that provides explorative recommendations to a user while avoiding recommendation of content that is not new to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
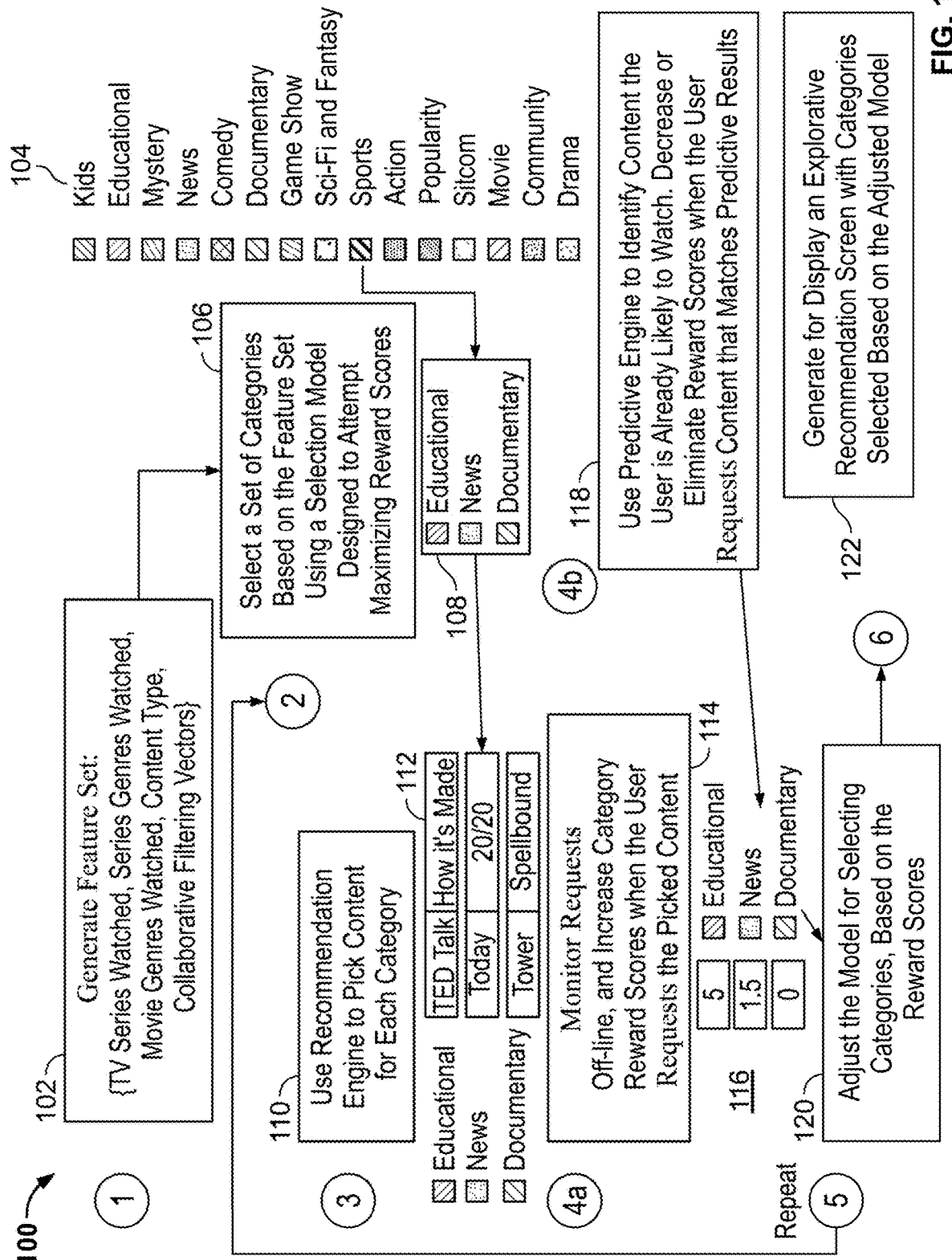
FIG. 1 shows an example of selecting content item identifiers for display, in accordance with some embodiments of the disclosure.

FIG. 1 shows an example 100 of selecting content item identifiers for display. In particular, FIG. 1 shows the operation of a content recommendation application. In some embodiments, the content recommendation application is executing on a server of an OTT content provider (e.g., Netflix, YouTube, Pandora) that is generating a recommendation screen for a particular use of the OTT system. In another example, the content recommendation application is executing on a media device of the user.

In some embodiments, the content recommendation application generates a feature set 102, e.g., based on a stored user profile. For example, the user profile may include a history of content requests received from the user in the past. The content requests may include requests for recorded video, requests to tune to a video that is being broadcast, requests for music playback, requests for a multimedia presentation, or any combination of the above. In one example, the content recommendation application extracts features (e.g., used features) including: a list of TV series watched by the user, a list of TV categories watched by the user, a list of movie categories watched by the user, a list content types requested by the user (e.g., content lengths, language, etc.), and a list of collaborative filtering vectors (e.g., filtering vectors as described in U.S. Pat. No. 8,239,412, which is hereby incorporated by reference herein in its entirety).

In some embodiments, the dimensionality of the feature set may be decreased by performing principle component analysis (PCA). For example, mathematical techniques may be used to perform an orthogonal transformation to convert the set of features (that are possibly correlated) into a set of values of linearly uncorrelated variables (i.e., principal components). In such embodiments, the principal components may be used instead of the raw features to perform the techniques described below.

In some embodiments, the content recommendation application selects a set of categories based on the feature set 102 (or based on the principle component vectors). For example, the content recommendation application may use a neural net as described with respect to FIG. 2. In one implementation, the set of categories is selected based on a superset of categories 104 (e.g., superset including categories such as "Kids," "Educational," "Mystery," and others, as depicted in FIG. 1). For example, the categories are selected using a model (e.g., a neural net) that is trained (e.g., by using deep learning techniques) to select categories from the superset 104 in a way that attempts to maximize a reward score that is calculated as described below. For example, the neural net may select a set of content categories 108 ("Educational," "News," and "Documentary") from superset 104.

In some embodiments, the content recommendation application proceeds to select 110 content items for each of the selected categories 108. For example, the content recommendation application may make an application program interface (API) call to a recommendation engine for each category (e.g., using the feature set as an input). The content recommendation application may use any of recommendations engines and recommendations techniques as described in U.S. Pat. No. 6,388,714 and in U.S. Pat. No. 6,756,997 (both of which are hereby incorporated by reference herein in their entirety). For example, the content recommendation application may select several content items for each of the categories as depicted in table 112.

Once the selection of content items is complete, the content recommendation application may (without displaying the selected content items) track 114 user's content requests for a certain period of time (e.g., for 10 days). Whenever the content recommendation application detects that the user requested a content item that matches an item in the table 112, the content recommendation application increases a reward score assigned to the selected set of categories 108. In some embodiments, the score for each category is tracked separately (as shown in table 116), while in other embodiments only the total score is tracked. For example, each time a "hit" occurs, the content recommendation application increments the reward score by 1.

In some embodiments, the content recommendation application also identifies 118 content items that are likely to be requested in the future based on a history of content item requests. For example, the content recommendation application may make an API call to a prediction engine (e.g., using the feature set as input). The content recommendation application may use any of predictive engines or techniques as described in U.S. Pat. No. 8,613,024 and in U.S. Patent Application Publication No. 2018/0189826 (both of which are hereby incorporated by reference herein in their entirety). In one implementation, the content recommendation application decreases a reward score for each "hit" that occurred at block 114 that also matches the content items that were already likely to be requested in the future by the user. For example, if the user was already likely to watch the show "How It's Made," an actual request for the show "How It's Made" will not result in a full score increase as described in block 114. For example, the content recommendation application may subtract 1 or 0.5 from the reward score. This allows the content recommendation application to train the neural net to select explorative content rather than conventional content recommendations that merely display content that the user is already likely to watch.

At 120, the content recommendation application may adjust the model (e.g., the neural net) using the reward score. In some embodiments, several sets of categories may have been selected at 106 and independently tracked at 114, thus allowing the neural net to be trained using multiple training examples. Further, steps 106-118 may be repeated several times further refining the model.

At 122, once the model (e.g., the neural net) is trained, the content recommendation application may generate an explorative screen using the trained neural net. For example, the content recommendation application may use the trained neural net to select a set of categories and use API calls to a recommendation engine to acquire content items for each category. Once the content items for each category are acquired, the content recommendation application may create an explorative display that includes identifiers of the selected content items. For example, the display may be structured as shown in table 112. For example, the explorative screen may include a carousel of categories arranged vertically, where each category includes horizontally arranged identifiers (e.g., titles) of the selected content items in those categories. In some embodiments, the user may initiate playback of a content item by selecting (e.g., by clicking on) an identifier of a certain content item from the explorative screen. For example, if the user clicks the "Spellbound" identifier, the TV show "Spellbound" may be presented to the user via the user's media device.

Figure 2:
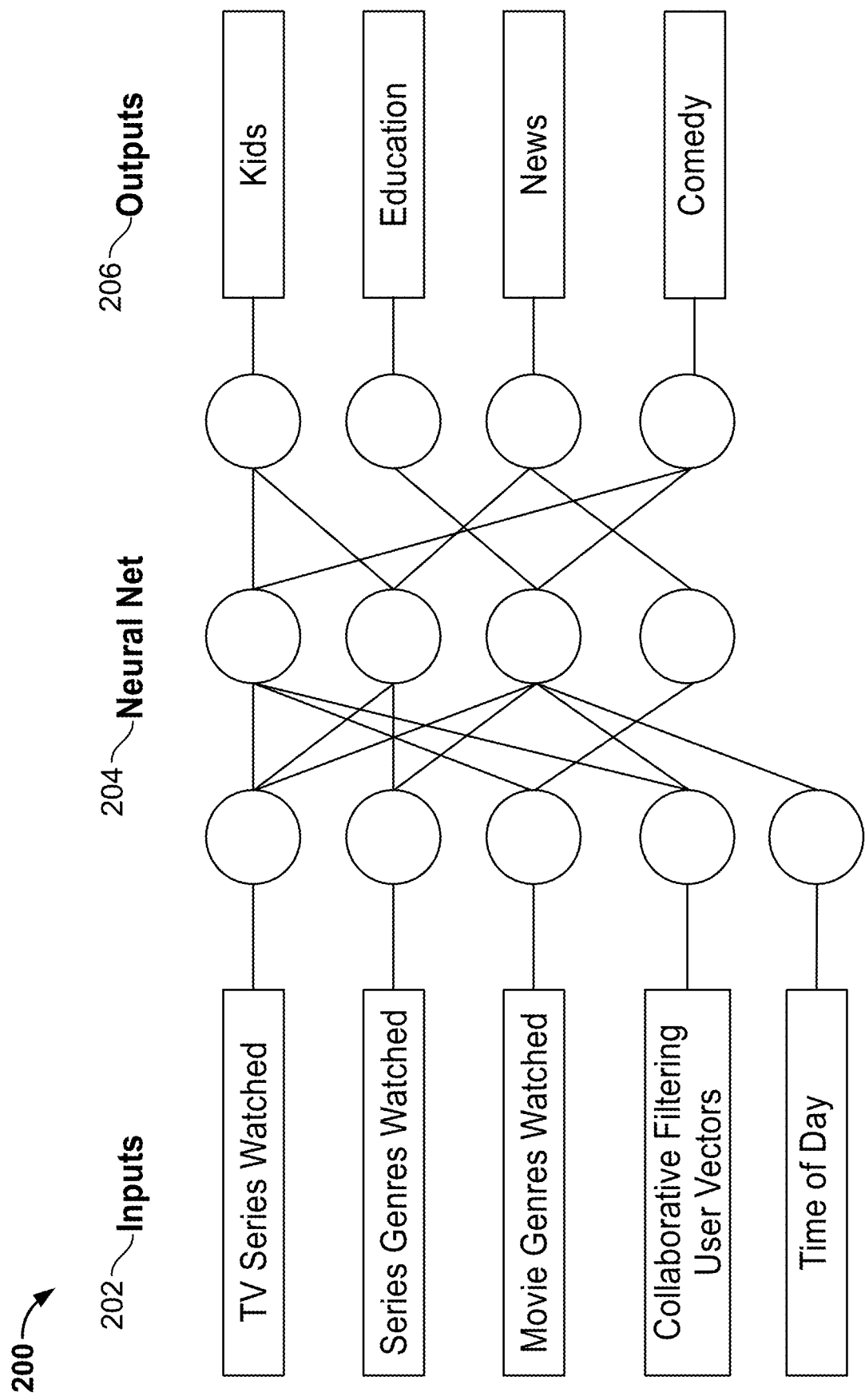
FIG. 2 shows an illustrative example of a category selection neural net, in accordance with some embodiments of the disclosure.

FIG. 2 shows an illustrative example 200 of a neural net 204, in accordance with some embodiments of the disclosure. For example, neural net 204 may be the same as the neural net that was used as a selection model in FIG. 1. In some embodiments, neural net 204 may include multiple neurons (e.g., as represented with circular shapes in FIG. 1) and connections between neurons (represented as straight lines in FIG. 1). Each neuron may be a data structure with two states (e.g., {1} or {ON} state, and {0} or {OFF} state). Each neuron may have positive or negative connections to neurons of the previous the layer and/or to neurons of the next layer. Each connection may be used to communicate the state of the neuron to other neurons. For example, the positive connection may send the state of the neuron, while the negative connection may send the inverse of the state of the neuron. The incoming connections may be used to set the state of the neuron. For example, if more {ON} signals are received than {OFF} signals, the neuron is set to the {ON} state. If more {OFF} signals are received than {ON} signals, the neuron is set to the {OFF} state. The connections may be added or removed as DAE 200 is trained (e.g., as explained below).

Neural net 204 may utilize a feature set (e.g., user feature set for an individual user as described in block 102) as input 202. In some embodiments, neural net 204 may also use calendar data (e.g., time of day) as one of the inputs 202. In some embodiments, the content recommendation application may maintain and train a neural net for each individual user and use the feature set of that user for input layer 202. In some embodiments, the content recommendation application converts the feature set to binary vectors that are then used as a starting points of input layer 202. In one implementation, the content recommendation application converts the feature set into principle components using PCA analysis. In that case, the principle components are used as starting points of input layer 202. In one implementation, the input layer 202 accepts the feature set, while the first layer of neural net 204 is defined by PCA-generated principle component vectors.

When an input layer 202 is fed into neural net 204, each bit of the feature set may be mapped to one of the neurons of layer 202. For example, a value of {1} in input layer 202 may cause the corresponding neuron of input layer 202 to be set to the {ON} state and a value of {0} in input layer 202 may cause the corresponding neuron to be set to the {OFF} state. The connections between neurons may then determine the state of the next layer, and so on, until the states of neurons of output layer 206 are determined. In some embodiments, some or all of the neurons may have a variable weight score. In one implementation, signals from neurons with higher weight scores may count more when determining a state of the next neuron. For example, if a neuron has a weight of 2, the input from that neuron may be weighted the same as inputs from two neurons with weight 1.

In some embodiments, the outputs layer 206 may include a set of neurons where each neuron corresponds to one of the content categories of superset 104. A neuron of the output layer 206 acquiring an {ON} state may represent the corresponding content category being selected, while a neuron of the output layer 206 acquiring an {OFF} state may represent the corresponding content category being not selected.

The neural net may be trained based on training examples {S, R} where S represents a set of selected content categories and R represents the reward calculated for the set S (e.g., as described in FIG. 1). For example, multiple training examples may be acquired by selecting multiple sets of categories at block 108 and abutting scores R for these sets at blocks 114-118. In some embodiment, neural net 204 is trained to select set S such that score R is maximized (e.g., by adjusting connection between neurons and/or weights of the neurons). For example, the content recommendation application may use deep deterministic policy gradients to reinforce neural network 204 to maximize the score R. In some embodiment, evolutionary training techniques may be used to train the neural net using training examples {S, R}, e.g., as discussed in U.S. patent application Ser. No. 16/216, 275, which is hereby incorporated by reference herein in its entirety.

In some embodiments, deep deterministic policy gradients training is improved by removing any delayed rewards. Instead, the reward sampling of the environment may be performed beforehand (e.g., as described in FIG. 1) making the model more likely to converge and removing the added complexity of trying to maximize exploration/optimal screens in real time.

Figure 3:
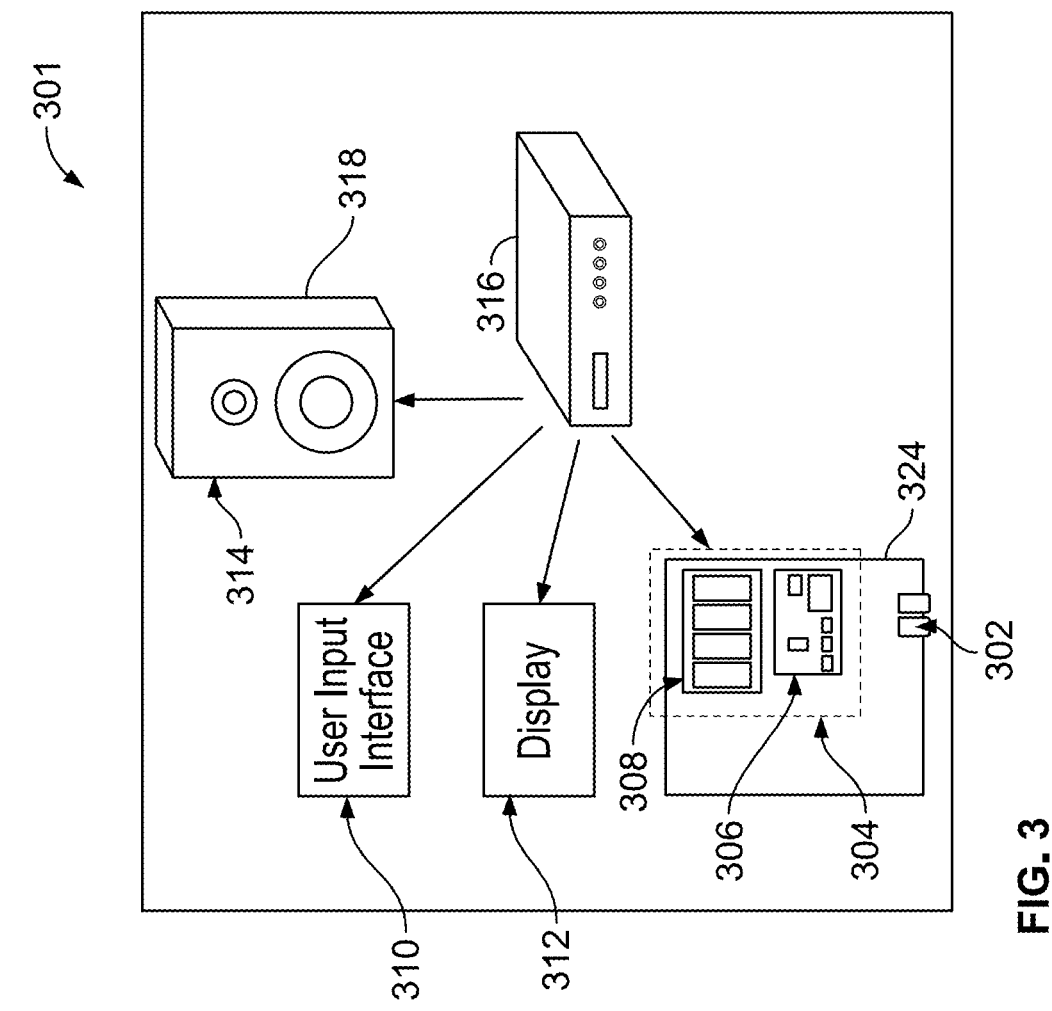
FIG. 3 shows a diagram of an illustrative media device, in accordance with some embodiments of the disclosure.
Figure 3:
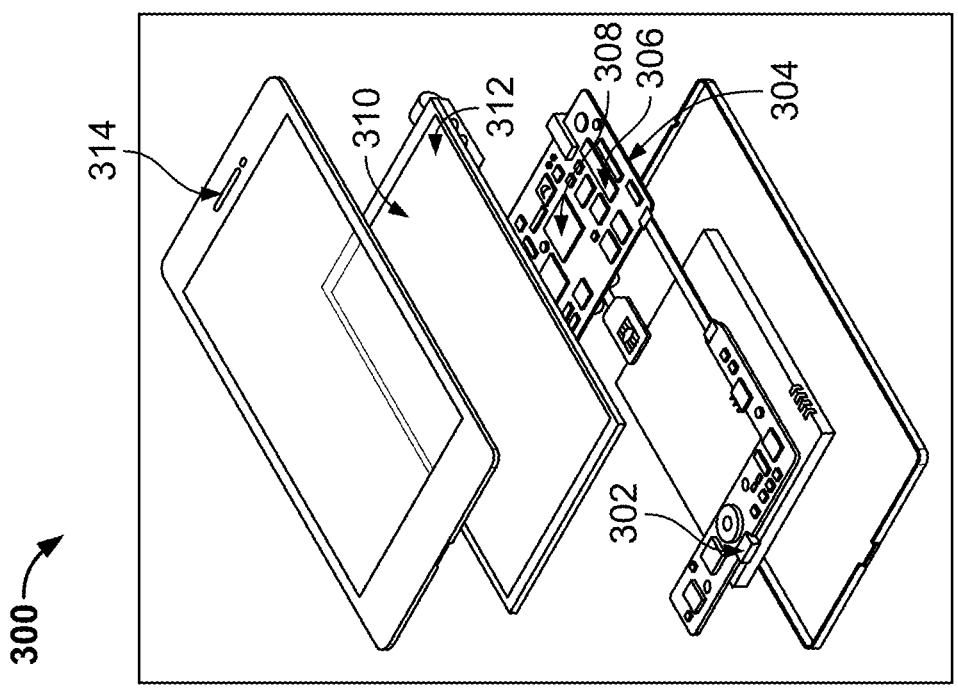

FIG. 3 shows a generalized embodiment of illustrative media devices 300 and 301. As depicted, media device 300 may be a smartphone or tablet, whereas media device 301 may be a home media system that includes equipment device 316 (e.g., a set-top box, CPU, video-game console, etc.) powered by processor 324. Media devices 300 and 301 may receive content and data via input/output (hereinafter "I/O") path 302. I/O path 302 may provide content (e.g., broadcast programming, on demand programming, Internet content, content available over a local area network (LAN) or wide area network (WAN), and/or other content) and data to control circuitry 304, which includes processing circuitry 306, display generator circuitry 307, and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Processing circuitry 306 may include display generation circuitry. For example, the display generation circuitry may generate the explorative recommendation screen as describe in FIG. 1. Display generation circuitry may include display generation functionalities that enable generations for display on display 312. In some embodiments, control circuitry 304 executes instructions for a user equipment device and/or application stored in memory (i.e., storage 308). Specifically, control circuitry 304 may be instructed by a user equipment device and/or application to perform the functions discussed above and below.

Control circuitry 304 may include communications circuitry suitable for communicating with a data source and processing server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 4, may be used to supplement storage 308 or instead of storage 308.

A user may send instructions to control circuitry 304 using user input interface 310 of media device 300 or user input interface 310 of media device 301. User input interface 310 may be any suitable user interface, such as a remote control, mouse, trackball, keypad, keyboard, touchscreen, touchpad, stylus input, joystick, voice recognition interface, or other user input interfaces. Display 310 may be a touchscreen or touch-sensitive display. In such circumstances, user input interface 310 may be integrated with or combined with display 312. Display 312 may be provided as a stand-alone device or integrated with other elements of media device 301. Speakers 314 may be provided as integrated with other elements of media device 300. In the case of media device 301, speakers 318 may be stand-alone units (e.g., smart speakers). The audio component of videos and other content displayed on display 312 may be played through speakers 318. In some embodiments, the audio may be distributed to a receiver (not shown), which processes and outputs the audio via speakers 318.

The content recommendation application may be implemented using any suitable architecture. For example, it may be a stand-alone application wholly implemented on media device 300. The content recommendation application and/or any instructions for performing any of the embodiments discussed herein may be encoded on computer-readable media. Computer-readable media includes any media capable of storing data. In some embodiments, the content recommendation application is a client server based application. Data for use by a thick or thin client implemented on media device 300 or media device 301 is retrieved on-demand by issuing requests to a server remote to the media device 300 or media device 301, respectively. For example, media device 300 may receive inputs from the user via input interface 310 and transmit those inputs to the remote server for processing and generating the corresponding outputs. The generated output is then transmitted to media device 300 for presentation to the user.

Figure 4:
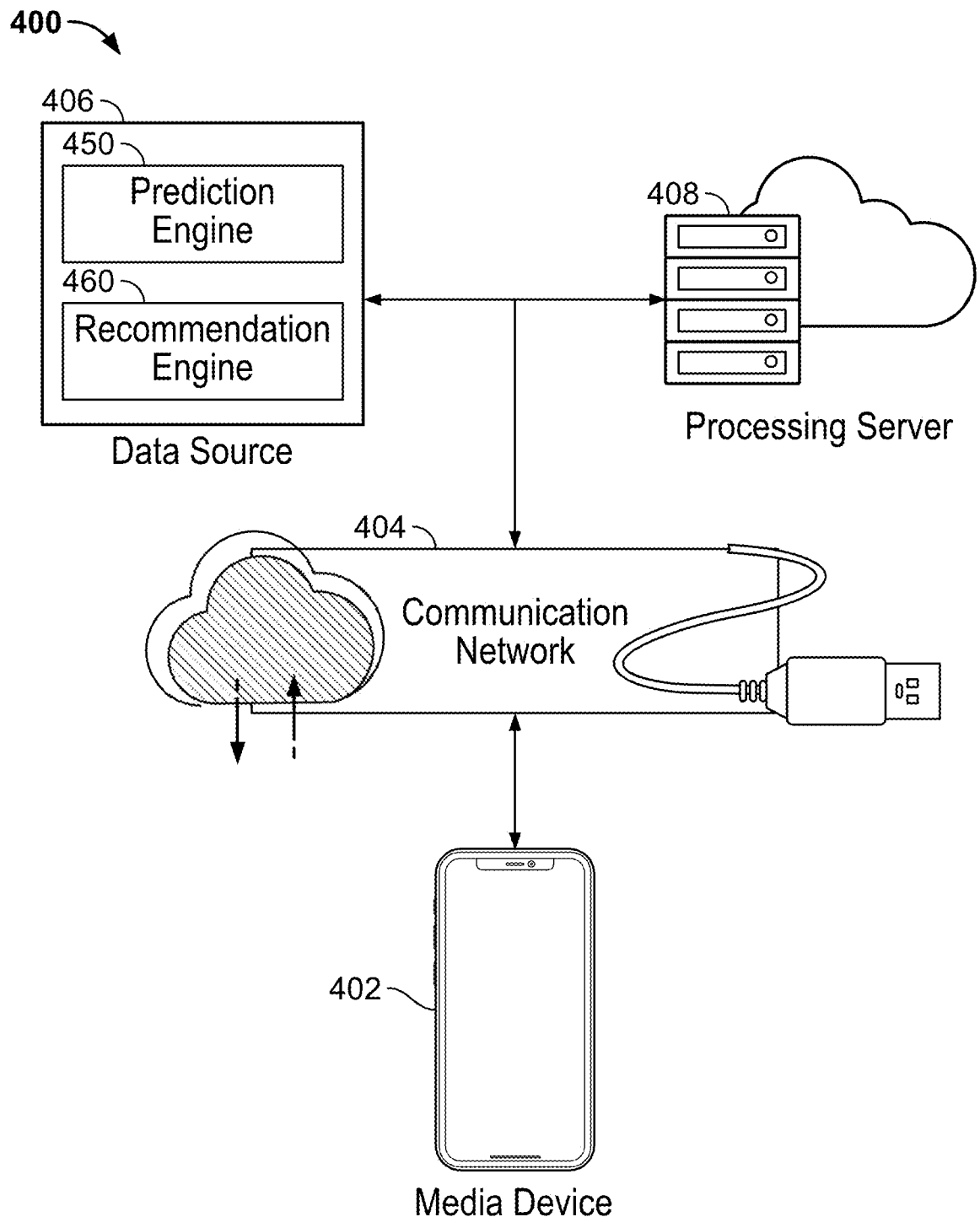
FIG. 4 is a diagram of an illustrative content recommendation application, in accordance with some embodiments of the disclosure.

FIG. 4 is a diagram of the content recommendation application in accordance with some embodiments of the disclosure. Media device 300 and media device 301 of FIG. 3 can be implemented in system 400 of FIG. 4 as media device 402. Media devices may function as a stand-alone devices or may be part of a network of devices. Various network configurations of devices may be implemented and are discussed in more detail below. In system 400, there may be multiple media devices, but only one of each is shown in FIG. 4 to avoid overcomplicating the drawing. In addition, each user may utilize more than one type of media device and also more than one of each type of media device.

Media device 402 may be coupled to communications network 404. Communications network 404 may be one or more networks including the Internet, a mobile phone network, mobile voice or data network (e.g., a 4G or LTE network), cable network, public switched telephone network, or other types of communications network or combinations of communications networks. Data source 406, processing server 408, and media device 402 may be connected to communication path 404 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between media device 402, Data source 406 and processing server 408, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communications network 404.

System 400 includes data source 406 coupled to communications network 404. There may be more than one of data source 406, but only one is shown in FIG. 4 to avoid overcomplicating the drawing. Data source 406 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Data source 406 may be the originator of content (e.g., a television broadcaster, a Webcast provider, etc.) or may not be the originator of content (e.g., an on-demand content provider, an Internet provider of content of broadcast programs for downloading, etc.). Data source 406 may include cable sources, satellite providers, on-demand providers, Internet providers, over-the-top content providers, or other providers of content. Data source 406 may also include a remote media server used to store different types of content (including video content selected by a user), in a location remote from any of the media devices. Systems and methods for remote storage of content and providing remotely stored content to user equipment are discussed in greater detail in connection with Ellis et al., U.S. Pat. No. 7,461,892, issued Jul. 20, 2010, which is hereby incorporated by reference herein in its entirety.

Data source 406 may also provide data necessary for operation of the content recommendation application. For example, data source 406 may include prediction engine 450 and recommendation engine 460 operating as described with respect to FIG. 1. For example, the content recommendation application may query data source 406 for recommended content items or for predictive content items using API calls via network 404. Data source 406 may then use one of the appropriate engine 450 or 460 to return predictive or recommended items (e.g., via network 404).

Content recommendation applications may be, for example, stand-alone applications implemented on media device 402, on processing server 408 or any combination of the two. For example, a content recommendation application may be implemented as software or a set of executable instructions which may be stored in storage 308, and executed by control circuitry 304 of a media device 402. In some embodiments, content recommendation applications may be client-server applications where only a client application resides on the media device, and a server application resides on processing server 408. For example, content recommendation applications may be implemented partially as a client application on control circuitry 304 of media device 402 and partially on processing server 408 as a server application running on control circuitry of processing server 408. When executed by control circuitry of processing server 408, the content recommendation application may instruct the control circuitry to generate the content recommendation application output (e.g., the expiatory recommendation screen) and transmit the generated output to media device 402. The client application may instruct control circuitry of the receiving media device 402 to generate the content recommendation application output. e.g., by using a neural net stored and trained on one of media device 402 or processing server 408.

Figure 5:
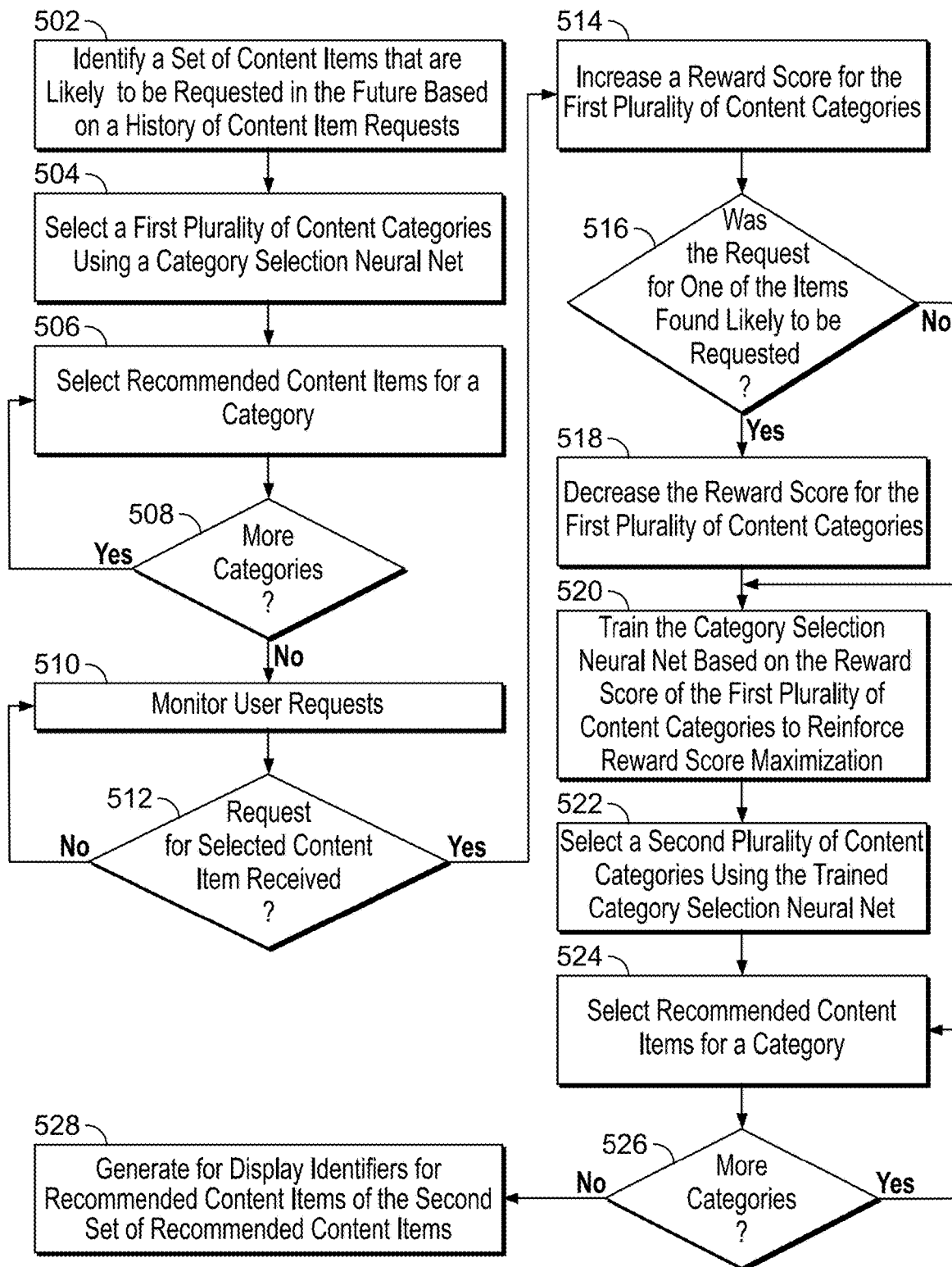
FIG. 5 is a flowchart of a detailed illustrative process for selecting content item identifiers for display, in accordance with some embodiments of the disclosure.

FIG. 5 is a flowchart of an illustrative process for selecting content item identifiers for display using a trained neural net, in accordance with some embodiments of the disclosure. In some embodiments, each step of process 500 can be performed by media device 402 (e.g., via control circuitry 304) or any of the system components shown in FIG. 3. In other implementations, each step of process 500 can be performed by processing server 408 (e.g., via control circuitry 304 of processing server 408). For example, each step of process 500 may be performed by control circuitry 304 executing instructions of the content recommendation application based on instructions stored in memory 308 to generate an explorative recommendation screen for a particular user (e.g., user of media device 402).

Process 500 begins at block 502 where control circuitry 304 identifies a set of content items that are likely to be requested by a particular user in the future based on a history of content item requests. For example, control circuitry 304 may issue an API call to prediction engine 450 where the user's history of content item requests is used as API call input. Control circuitry 304 may then receive, via network 404, the set of content items that are likely to be requested. For example, if the user has watched every episode of the "Game of Thrones" show, control circuitry 304 may determine that the user is highly likely to continue watching the "Game of Thrones" episodes, even if no recommendations of any kind are provided.

At 504, control circuitry 304 selects a first plurality of content categories using a category selection neural net. In some embodiments, this step is performed as described in relation to block 106 of FIG. 1. For example, a neural net 204 may be used where a feature set of the particular user is used as input 202 to select a set of content categories as output 206. The feature set may include one or more of content item requests data, content category requests data, time data, and collaborative filtering vectors. In some embodiments, the neural net is stored on media device 402. Alternatively, the neural net may be stored on a processing server 408.

At 506, control circuitry 304 may select a set of recommended content items for one of the first plurality of content categories. For example, control circuitry 304 may make an API call to recommendation engine 460 via network 404 (e.g., where the category and user history are used as function inputs). The control circuitry 304 may receive content item recommendation for the requested content category from the recommendation engine. At 508, control circuitry 304 checks if there are more categories in the first plurality of content categories. If so, control circuitry 304 proceeds back to step 506 and repeats that step for the next category of the first plurality of content categories. Newly received recommended content items may be concentrated into a first set of recommended content items. If there are no more categories in the first plurality of content categories, control circuitry 304 proceeds to step 510. In some embodiments, control circuitry 304 may reduce the first set of recommended content items by removing at least one content item that also belongs to the set of content items that are likely to be requested in the future (e.g., as determined in step 506). For example, some content items may be so likely to be requested as to present no value for training the neural net. For example, if the user watches a news program every day at 9:00 PM, there is no value in recommending such programming to the user.

At 510, control circuitry 304 monitors user requests for content. For example, step 510 may continue over a preset time period (e.g., one week). In some embodiments, control circuitry 304 may examine all requests for content items received from the particular user (e.g., via media device 402). At 512, control circuitry 304 may check if the request for content item was received that matched the first set of recommended content items created by steps 506-508. If not, control circuitry 304 may continue monitoring user requests at 510; otherwise control circuitry 304 proceeds to step 514.

At 514, control circuitry 304 may increase a reward score for the first plurality of content categories. For example, the score may be increased by 1. At 516, control circuitry 304 performs an additional check to determine whether the requested content item is included in the set of content items that are likely to be requested in the future, as identified at step 502. If so, control circuitry 304 proceeds to 518 where control circuitry 304 decreases the reward score for the first plurality of content categories (e.g., by 1 or by 0.5). Otherwise, step 518 is skipped and process 500 proceeds to step 520.

In some embodiments, steps 510-518 may be repeated multiple times over a certain time period (e.g., 10 days) every time a request for content item is received. In this way, the reward score may be adjusted during the entire time period. The final reward score (e.g., at the end of the time period) is used in step 520 to train the category selection neural net (e.g., neural net 204) to reinforce reward score maximization. In one implementation, several pluralities of categories are selected at step 504 and a reward is score is calculated for each plurality. Each such reward score may be used to the train the neural net as described in relation to FIG. 2. Because the neural net training process does not require actually showing the recommendations to the user, the speed at which the neural net is trained is greatly increased.

Once the neural net is trained (e.g., by modification of links between neurons or by adjusting weights of each neuron), process 500 proceeds to step 522. At 522, control circuitry 304 uses the trained neural net to select a second plurality of content categories (e.g., in the same way as described in regard to step 504). At 524, control circuitry 304 may select a second set of recommended content items for the second plurality of content categories (e.g., by making appropriate API calls to the recommendation engine 450). At 526, control circuitry 304 may choose to repeat step 524 if more categories remand for which the content items needs to be selected; otherwise control circuitry 304 may proceed to block 528.

At 528, control circuitry 304 may generate for display identifiers for recommended content items of the second set of recommended content items. For example, control circuitry 304 may generate an explorative display where the recommended content items are identified by titles and arranged using horizontal category carousels (e.g., as arranged in table 112). In some embodiments, control circuitry 304 may generate an explorative display where the recommended content items are identified by titles and arranged in a list. In other embodiments, control circuitry 304 may generate an explorative display as part of an EPG screen (e.g., an EPG screen where the recommended items are highlighted).

Figure 6:
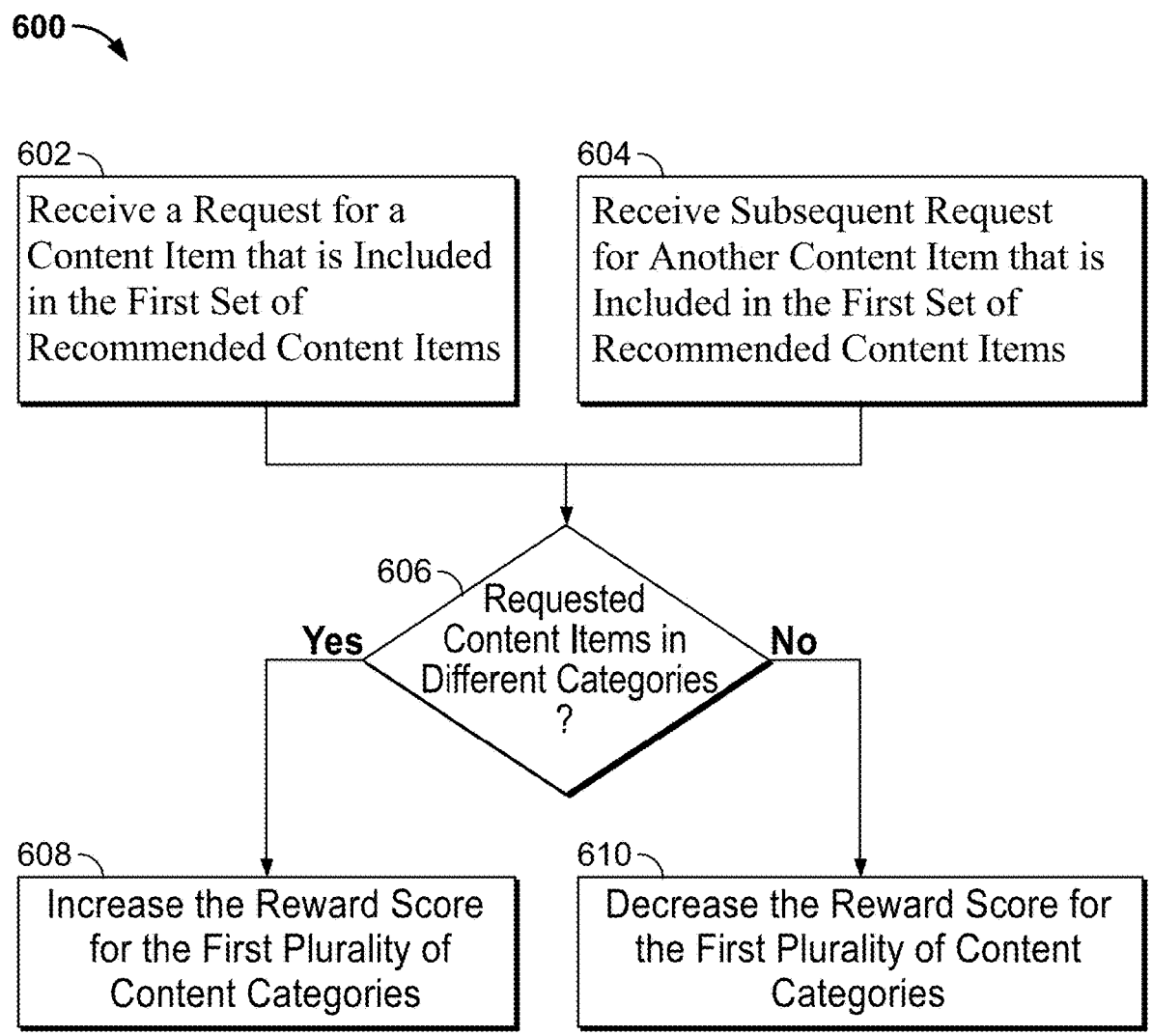
FIG. 6 is flowchart of a detailed illustrative process of training a neural network, in accordance with some embodiments of the disclosure.

FIG. 6 is a flowchart of an illustrative process of training a neural network, in accordance with some embodiments of the disclosure. In some embodiments, each step of process 600 can be performed by media device 402 (e.g., via control circuitry 304) or any of the system components shown in FIG. 3. In another implementation, each step of process 600 can be performed by processing server 408 (e.g., via control circuitry 304 of processing server 408). For example, each step of process 600 may be performed by control circuitry 304 executing instructions of content recommendation application based on instructions stored in memory 308 (e.g., user of media device 402). In some embodiments, steps of process 600 are performed in addition to steps of process 500.

In particular, a further goal of the content recommendation application may be to present content item recommendations that are not homogenous. To that end, while performing the monitoring in step 510, control circuitry 304 may perform steps of process 600 to train the content category selection neural net differently. For example, reward scores may be calculated differently to encourage selection of non-homogenous content item recommendations.

At 602, control circuitry 304 may receive a request from the user for a requested content item (e.g., a request to watch or record the content item) that is included in the first set of recommended content items (selected at step 504). This "hit" may lead to an increased reward score (e.g., at step 514). At 604, control circuitry 304 may receive a subsequent request for a another content item that is also included in the first set of recommended content items.

At step 606, control circuitry 304 may check whether requested content items from steps 602 and 604 belong to different categories. If they do, control circuitry 304 may further increase the reward score for the first plurality of content categories at step 608. Alternatively, if the requested content items from steps 602 and 604 are from the same category, control circuitry 304 may decrease the reward score at step 610. Such a decrease in reward score will help to better train the neural net (e.g., neural net 204) to select categories that will lead to non-homogenous content item recommendations.

Figure 7:
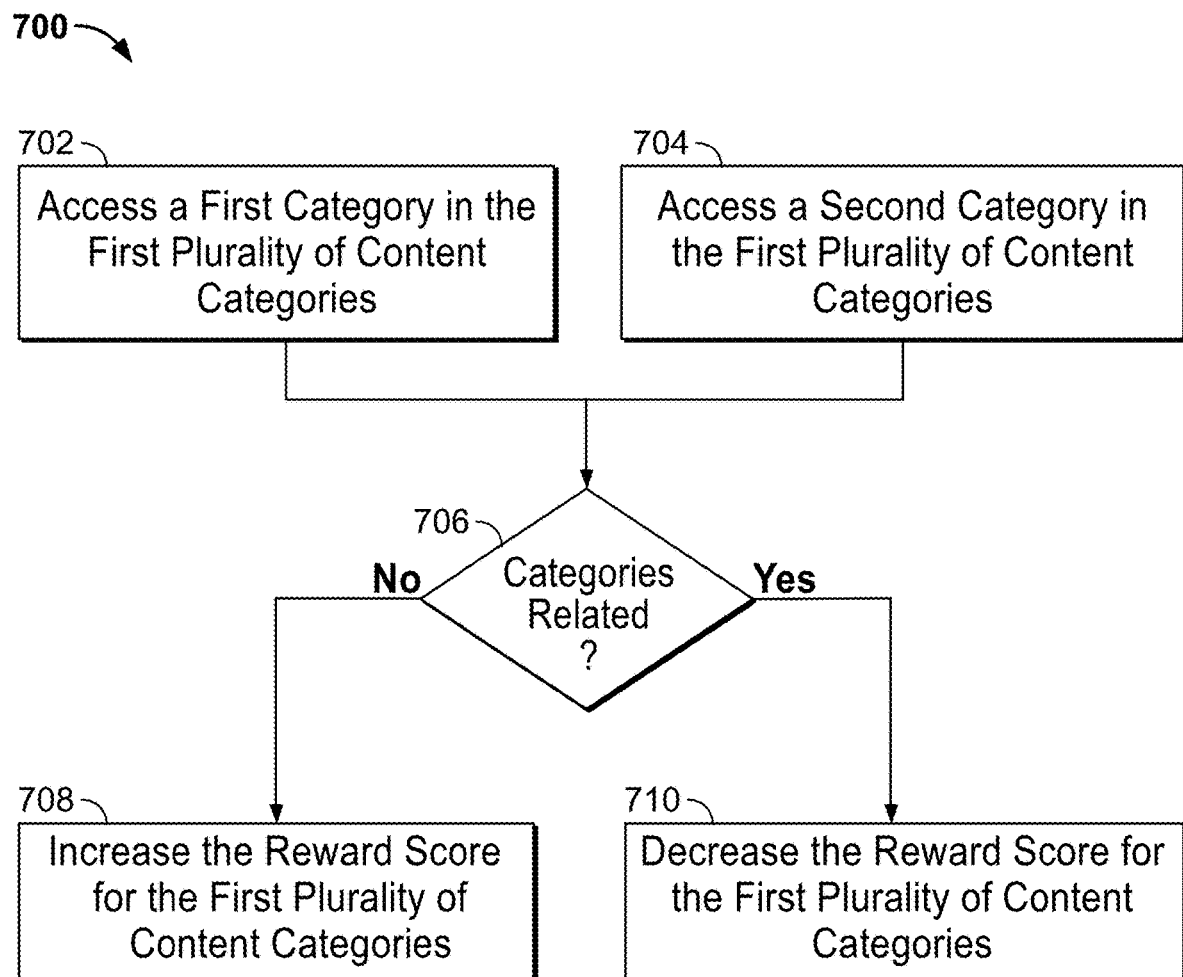
FIG. 7 is flowchart of another detailed illustrative process of training a neural network, in accordance with some embodiments of the disclosure.

FIG. 7 is a flowchart of an illustrative process of training a neural network, in accordance with some embodiments of the disclosure. In some embodiments, each step of process 700 can be performed by content device 402 (e.g., via control circuitry 304) or any of the system components shown in FIG. 3. In other implementations, each step of process 700 can be performed by processing server 408 (e.g., via control circuitry 304 of processing server 408). For example, each step of process 600 may be performed by control circuitry 304 executing instructions of the content recommendation application based on instructions stored in memory 308. In some embodiments, steps of process 700 are performed in addition to steps of process 500.

In particular, a further goal of the content recommendation application may be to present content item recommendations that are not homogenous. To that end, while performing the monitoring in step 510, control circuitry 304 may perform steps of process 700 to train the content category selection neural net differently. For example, reward scores may be calculated differently to encourage selection of non-homogenous content item recommendations. In some embodiments, steps of process 700 are performed in addition to steps of process 500.

At 702, control circuitry 304 may receive a request from the user to access a content item from one of the categories in the first plurality of content categories (selected at step 504.) At 704, control circuitry 304 may receive a request from the user to access (e.g., watch or record) a content item from another of the categories in the first plurality of content categories (selected at step 504.)

At step 706, control circuitry 304 may check whether the category accessed in step 702 and the category accessed in step 704 are sufficiently similar. For example, control circuitry 304 may maintain a list of relatedness between content categories. For example, categories "horror" and "suspense" may be highly related, while categories "romance" and "education" may be deemed as not related. If the categories are not related, control circuitry 304 may further increase the reward score for the first plurality of content categories at step 708. Alternatively, if the categories are related, control circuitry 304 may decrease the reward score at step 710. Such a decrease in reward score will help to better train the neural net (e.g., neural net 204) to select categories that will lead to non-homogenous content item recommendations.

It should be noted that processes 500-700 or any step thereof could be performed on, or provided by, any of the devices shown in FIGS. 1-4. For example, the processes may be executed by control circuitry 304 (FIG. 3) as instructed by a content recommendation application. In addition, one or more steps of a process may be omitted, modified, and/or incorporated into or combined with one or more steps of any other process or embodiment (e.g., steps from process 500 may be combined with steps from processes 600 and 700). In addition, the steps and descriptions described in relation to FIGS. 5-7 may be done in alternative orders or in parallel to further the purposes of this disclosure. For example, each of these steps may be performed in any order or in parallel or substantially simultaneously to reduce lag or increase the speed of the system or method.

A content recommendation application may be a stand-alone application implemented on a media device or a server. The content recommendation application may be implemented as software or a set of executable instructions. The instructions for performing any of the embodiments discussed herein of the content recommendation application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 3, the instructions may be stored in storage 308 and executed by control circuitry 304 of a computer device 301.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    identifying, based on history of content item requests, a list of content items related to a first category;
    removing a content item, from the identified list of content items, that is likely to be requested by a user in future without having previously been recommended;
    based on receiving a first request for a content item, from the identified list of content items, wherein the first request is related to the first category, increasing a reward score for the list of content items related to the first category;
    receiving a second request, subsequent to the first request, for a second category;
    in response to the second request:
    accessing a list of relatedness to determine whether the first and the second category are related; and
    in response to determining, based on the list of relatedness, that the first and second category are related, decreasing the reward score for the list of content items related to the first category.

2. The method of claim 1, wherein, identifying, based on history of content item requests, the list of content items related to the first category, further comprises:
    accessing user profile that includes a history of content requests received from the user;
    generating a feature set based on the profile; and
    identifying the list of content items related to the first category based on the generated feature set.

3. The method of claim 1, further comprising:
    determining whether a content item, from the identified list of content items, is likely to be requested by the user in the future without having previously been recommended; and
    removing the content item, from the identified list of content items, based on determining that the content item is likely to be requested by the user in the future without having previously been recommended.

4. The method of claim 3, wherein the content item likely to be requested by the user in the future is an episode of a TV series previously consumed by the user.

5. The method of claim 1, wherein the first and second category are determined to be related based on the list of relatedness if the first and second categories are horror and suspense.

6. The method of claim 1, further comprising tracking reward score for the first category separate from reward scores for other categories.

7. The method of claim 1, further comprising generating an explorative display that includes identifiers of the list of content items related to the first category for selection.

8. The method of claim 7, wherein the explorative display includes identifiers of selected content items in a horizontally arranged format.

9. The method of claim 1, wherein decreasing the reward score is indicative of the second category being non-homogenous to the first category.

10. The method of claim 1, wherein the first and second category are determined to be unrelated based on the list of relatedness if the first and second categories are romance and education.

11. A system comprising:
    communications circuitry configured to access a list of content items related to a first category; and
    control circuitry configured to:
    identify, based on history of content item requests, a list of content items related to a first category;
    remove a content item, from the identified list of content items, that is likely to be requested by a user in future without having previously been recommended;
    based on receiving a first request for a content item, from the identified list of content items, wherein the first request is related to the first category, increase a reward score for the list of content items related to the first category;
    receive a second request, subsequent to the first request, for a second category;
    in response to the second request:
    access a list of relatedness to determine whether the first and the second category are related; and
    in response to determining, based on the list of relatedness, that the first and second category are related, decrease the reward score for the list of content items related to the first category.

12. The system of claim 11, wherein, identifying, based on history of content item requests, the list of content items related to the first category, further comprises, the control circuitry configured to:
    access user profile that includes a history of content requests received from the user;
    generate a feature set based on the profile; and
    identify the list of content items related to the first category based on the generated feature set.

13. The system of claim 11, further comprising, the control circuitry configured to:
    determine whether a content item, from the identified list of content items, is likely to be requested by the user in the future without having previously been recommended; and
    remove the content item from the identified list of content items, based on determining that the content item is likely to be requested by the user in the future without having previously been recommended.

14. The system of claim 13, wherein the content item that is likely to be requested by the user in the future is an episode of a TV series previously consumed by the user.

15. The system of claim 11, wherein the first and second category are listed as related in the list of relatedness if the first and second categories are horror and suspense.

16. The system of claim 11, further comprising, the control circuitry configured to track reward score for the first category separate from reward scores for other categories.

17. The system of claim 11, further comprising, the control circuitry configured to generate an explorative display that includes identifiers of the list of content items related to the first category for selection.

18. The system of claim 17, wherein the explorative display includes identifiers of selected content items in a horizontally arranged format.

19. The system of claim 11, wherein decreasing the reward score is indicative of the second category being non-homogenous to the first category.

20. The system of claim 11, wherein the first and second category are determined to be unrelated based on the list of relatedness if the first and second categories are romance and education.

* * * * *